Dec. 6, 1966   G. DE COYE DE CASTELET   3,289,938
AIR-CONDITIONING OF AUTOMOBILE VEHICLES
Filed Nov. 30, 1964
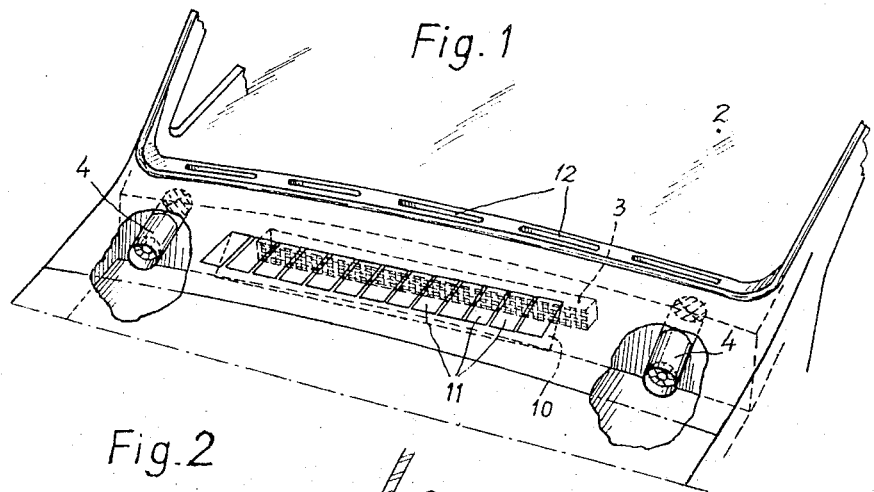
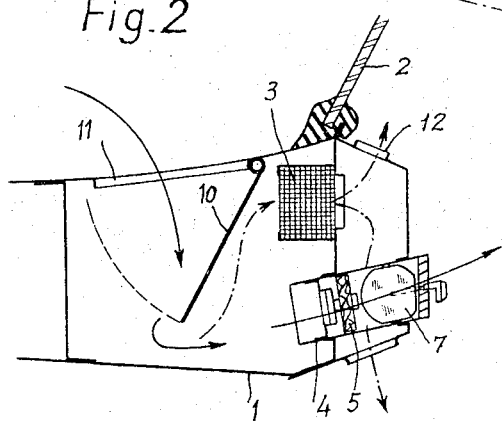
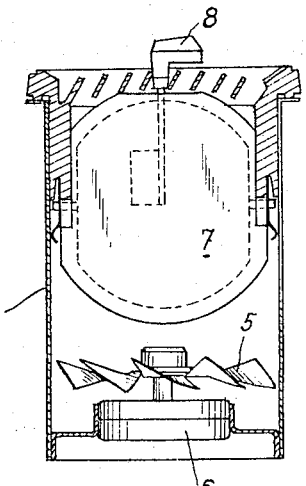
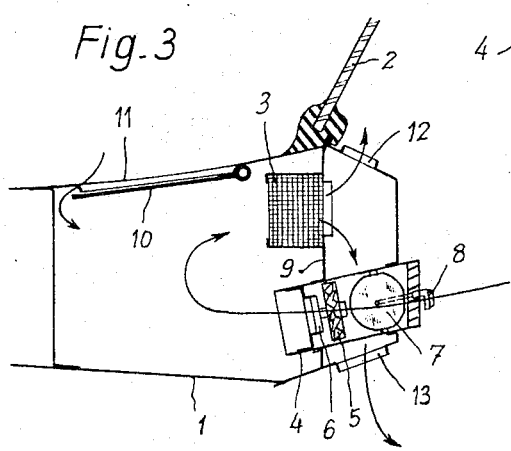
Inventor
Gaëtan de Coye de Castelet
By Stevens, Davis, Miller & Mosher
Attorneys United States Patent Office 3,289,938
Patented Dec. 6, 1966

3,289,938
AIR-CONDITIONING OF AUTOMOBILE VEHICLES
Gaëtan de Coye de Castelet, Billancourt, France, assignor to Regie Nationale des Usines Renault, Billancourt, France
Filed Nov. 30, 1964, Ser. No. 414,773
Claims priority, application France, Dec. 2, 1963, 955,730, Patent 1,387,145
2 Claims. (Cl. 237—34)

The present invention relates to the air-conditioning of vehicles and is concerned with an arrangement in which the air-conditioning devices are mounted in the interior of a hollow transverse girder mounted vertically beneath the windscreen, coupling together the sides of the chassis-body according to the type forming the object of Patent 3,208,368 to Lucien Peras and applicant's patent application No. 400,787 of October 1, 1964, for "Air-Conditioning Device for Automobile Vehicles."

In the arrangement forming the object of the invention, the supply of air for ventilation and heating is obtained by means of two lateral ventilation units with suction or delivery fans driven by electric motors with axial air-gaps and with variable directions of rotation, enabling, for one direction of rotation, the outer air to be drawn-in and delivered into the passenger space and, for the other direction of rotation, to obtain a circulation of the internal air of the passenger space by re-cycling with introduction of external air at will in regulated proportions, or by the dynamic pressure of air due to the movement of the vehicle, which acts on a valve.

In the accompanying drawings:

FIG. 1 is a partial view in perspective of the front part of the vehicle showing the arrangement of the air-conditioning devices in the front transverse girder;

FIGS. 2 and 3 are views in cross-section taken in a plane perpendicular to the front girder in its central part;

FIG. 4 shows to a larger scale the detail of a lateral ventilation unit.

Referring now to the drawings, it can be seen that the hollow girder 1 is arranged below the windscreen 2 and extends slightly towards the front. The heating radiator 3 is mounted transversely in this beam and extends over the greater part of the width of the girder.

Two ventilation units formed by tubes 4 are disposed in the vicinity of the lateral extremities of the girder, and open into the passenger space of the vehicle. These tubes 4 contain a two-directional helicoidal fan driven by an electric motor 6 with axial air-gap and having a variable direction of rotation. A valve 7 pivotally-mounted in the tube 4 and suitably controlled by a handle 8 enables all communication between the passenger space and the hollow girder to be shut-off.

It will be noted that the radiator 3 and the tubes 4 are supported by an auxiliary partition 9 of the girder 1.

A transverse shutter or valve 10, pivotally-mounted inside the girder, can uncover or close orifices 11 of appropriate numbers on the upper face of the girder. In the rear part of the girder are also provided orifices 12 for de-misting the windscreen and 13, for heating air. The shutter 10 is operated from the interior of the vehicle.

The radiator is provided with a shut-off valve for the intake of hot cooling water from the engine.

The operation of the air-conditioning device is as follows:

The shutter 10 being open, and the contacts of the motors 6 being put into a position such that the suction of the fans 5 of these motors takes place inside the girder, of the outer air is drawn into the girder and is delivered by the fans and by the dynamic pressure of air into the passenger space. If it is desired to circulate hot air, it is only necessary to permit the hot circulating water from the engine to pass into the radiator 3. These air-conditioning characteristics are shown in FIG. 2.

In order to obtain a more powerful heating of the passenger space, the shutter 10 is placed in a closed position and the direction of rotation of the electric motors 6 is reversed, so that the suction of the fans 5 takes place from the interior of the passenger space. There is thus produced a recycling of the air inside the vehicle, as indicated by the arrows of FIG. 3.

The shutter 10 should never be completely closed, so that a certain quantity of external air, which can be regulated at will, can always pass into the girder in order to prevent any danger of absorption of vitiated air.

In this case, there could be provided an automatic opening of the shutter 10 under the dynamic pressure of the air.

It will of course be understood that the air-conditioning devices could be placed in a chamber located under the windscreen, or may be mounted in the hollow girder coupling together the two sides of the chassis-body, as indicated above.

I claim:

1. An air-conditioning device for vehicles having a transverse girder disposed under a windscreen and having a chamber formed therein comprising a heating radiator disposed within said chamber, at least one air intake orifice for feeding outside air to said chamber, shutter means for selectively opening and closing said orifice, at least one lateral tubular unit connecting said chamber to a passenger compartment of said vehicle, a double direction helicoidal fan driven by a bidirectional axial air gap electric motor, both of which are mounted in said tubular unit whereby selective operation of said motor and said shutter means allows drawing in external air and delivering it to the passenger compartment and allows withdrawing air from said passenger compartment for recycling said air through said radiator.

2. An air-conditioning device for vehicles according to claim 1 further comprising orifices in said chamber disposed for demisting said windscreen.

References Cited by the Examiner
UNITED STATES PATENTS

| | | | |
|---|---|---|---|
| 2,306,796 | 12/1942 | Staley et al. | 98—2 |
| 2,382,712 | 8/1945 | Hans | 98—2 |
| 2,391,408 | 12/1945 | Galamb | 98—2 |
| 2,738,718 | 3/1956 | Reynolds | 98—2 |
| 2,837,288 | 6/1958 | Owen | 98—2 |

EDWARD J. MICHAEL, *Primary Examiner.*